(12) United States Patent
Forsyth

(10) Patent No.: US 7,904,900 B2
(45) Date of Patent: Mar. 8, 2011

(54) METHOD IN A NETWORK OF THE DELIVERY OF FILES

(75) Inventor: Ben Forsyth, San Francisco, CA (US)

(73) Assignee: FileWave Financial Services GmbH, Wil (CH)

( * ) Notice: Subject to any disclaimer, the term of this patent is extended or adjusted under 35 U.S.C. 154(b) by 1073 days.

(21) Appl. No.: 10/578,866

(22) PCT Filed: Nov. 15, 2004

(86) PCT No.: PCT/CH2004/000690
§ 371 (c)(1),
(2), (4) Date: Jan. 30, 2007

(87) PCT Pub. No.: WO2005/048004
PCT Pub. Date: May 26, 2005

(65) Prior Publication Data
US 2007/0168348 A1    Jul. 19, 2007

(30) Foreign Application Priority Data
Nov. 14, 2003    (GB) .................................... 0326626.9

(51) Int. Cl.
G06F 9/445    (2006.01)

(52) U.S. Cl. ......................................... 717/178; 717/173
(58) Field of Classification Search ....................... None
See application file for complete search history.

(56) References Cited

U.S. PATENT DOCUMENTS

| 6,066,182 | A  | * | 5/2000  | Wilde et al. | ........... 717/175 |
| 6,324,690 | B1 | * | 11/2001 | Luu          | ........... 717/177 |
| 6,327,617 | B1 |   | 12/2001 | Fawcett      |                     |

FOREIGN PATENT DOCUMENTS

| EP | 0 841 615 | 5/1998 |
| GB | 2 348 721 | 10/2001 |

* cited by examiner

*Primary Examiner* — Chuck O Kendall
(74) *Attorney, Agent, or Firm* — Moetteli & Associès SàRL

(57) ABSTRACT

A method in a network of the delivery of files from a server computer (101) to a client computer (102) in which the client computer is polling the server computer looking to see in the server if at least one new file associated with this client computer is available. If yes, then the client computer is downloading the files associated with this client computer at specific intervals. The client computer is all by itself polling the server computer at specific intervals and it itself controls the downloading of the updates which occurs at times during which the downloading does not disturb the working of the client computer.

8 Claims, 5 Drawing Sheets

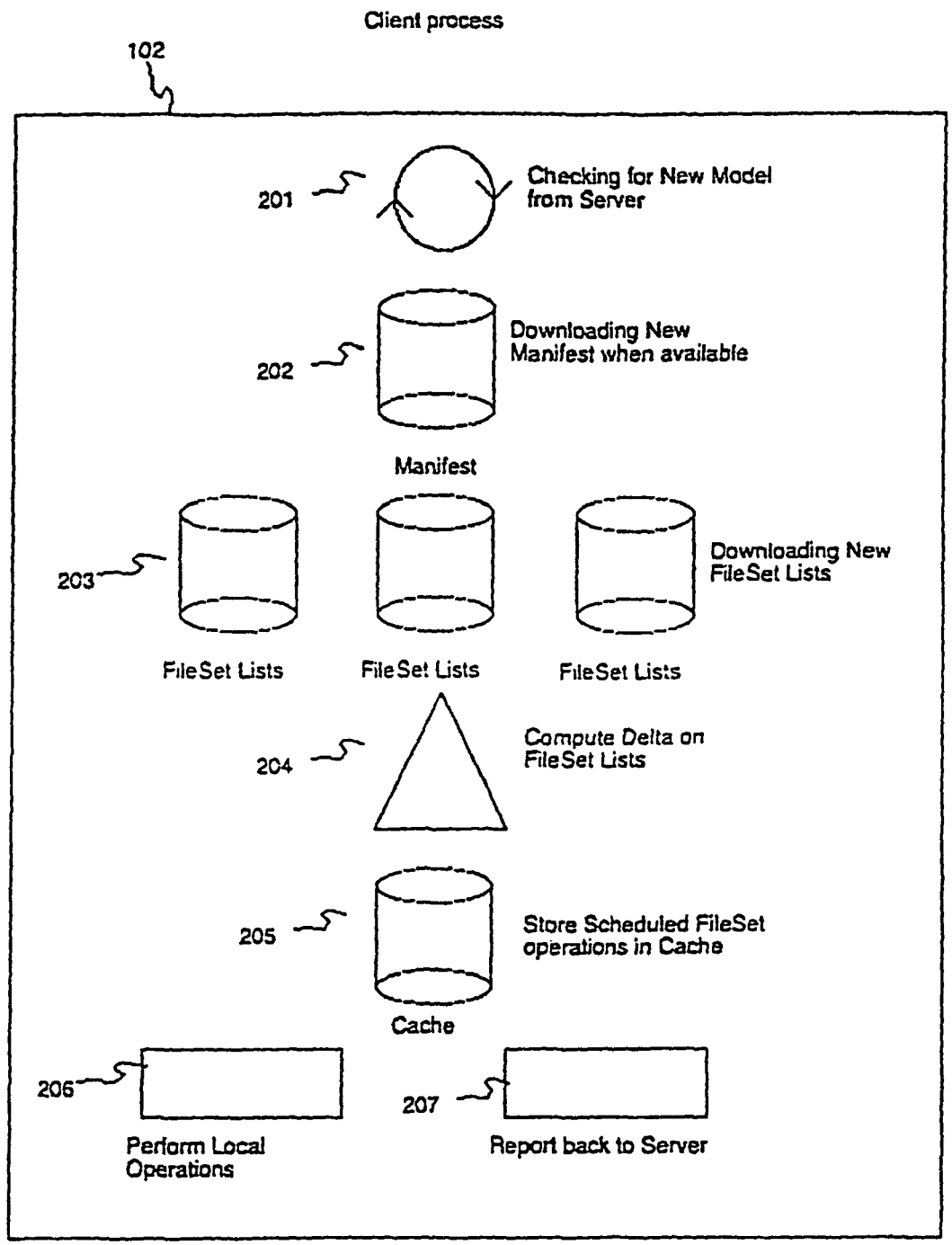

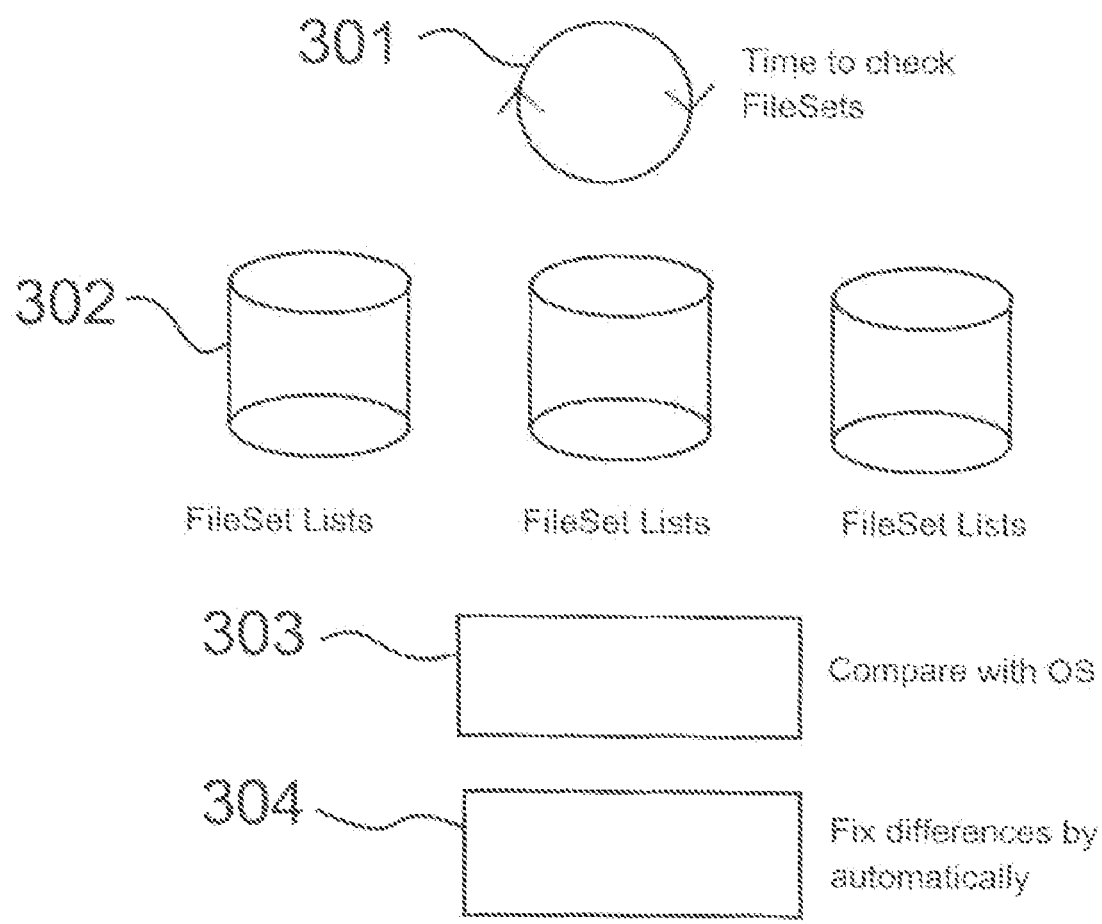

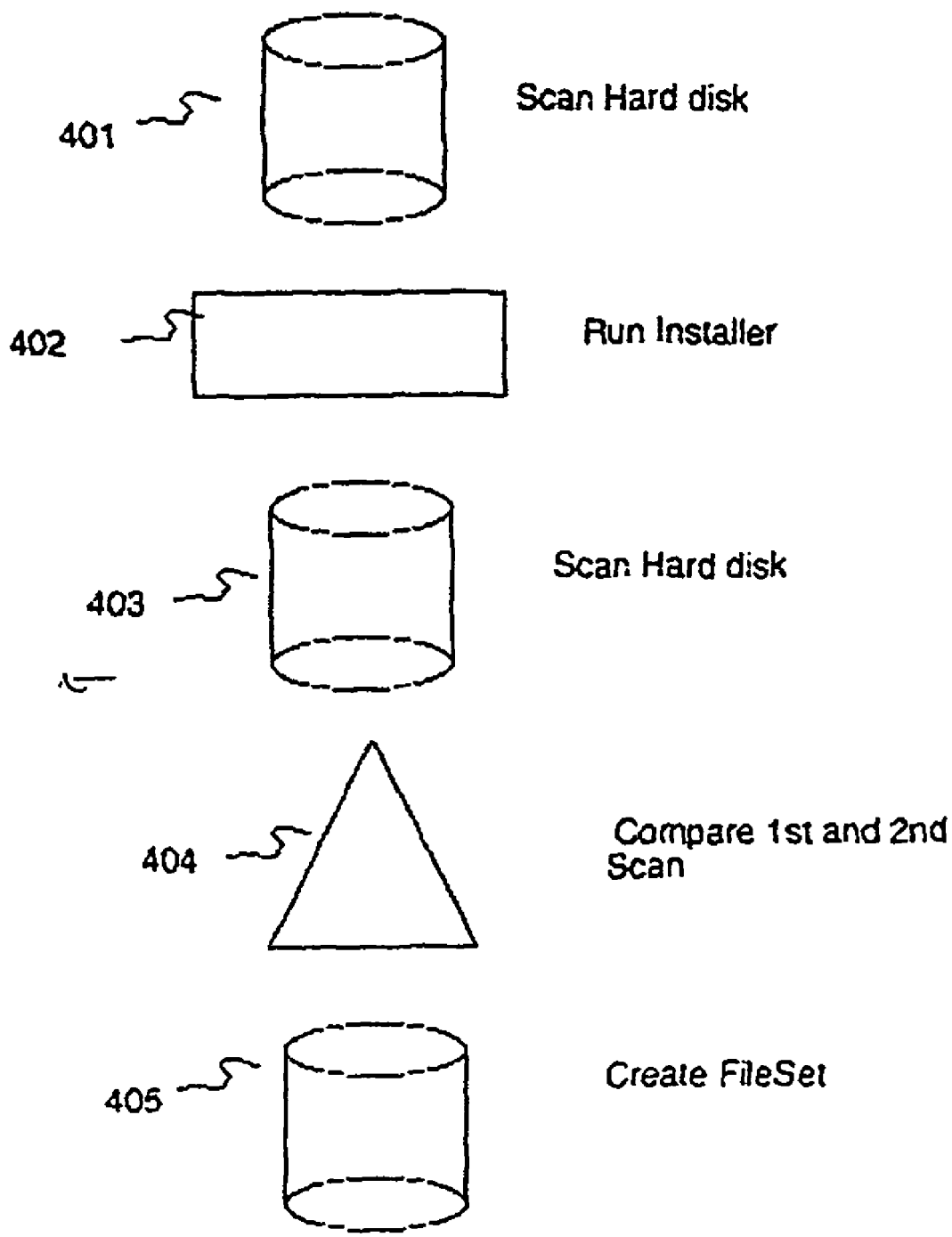

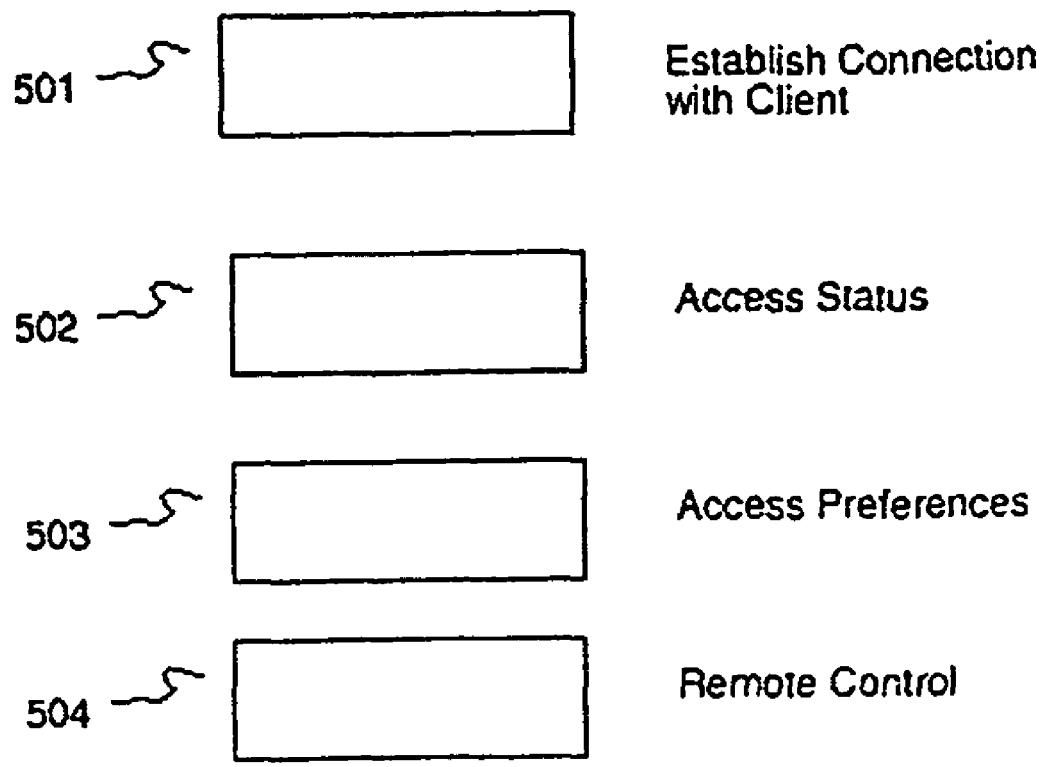

METHOD IN A NETWORK OF THE DELIVERY OF FILES

BACKGROUND OF INVENTION

The present invention relates to a method in a network of the delivery of files from a server computer to a client computer.

Managing software on a large network of computers is a daunting task. Software updates are frequently needed to fix bugs or security leaks in existing software installations. Installing these updates requires people to walk to each computer and run an installation program. When a member of the IT Staff performs the installation during normal business hours, the employee user of the computer loses valuable production time waiting for this installation to occur. To avoid this scenario, the IT Staff member might work an overtime shift at night or on a weekend to install the updates. Worst case is outside contract help is employed to run the installation at a significant cost. Once the software is installed, it is subject to malicious manipulation either by the user or external forces therefore rendering the installation worthless. The only means to return the software back to the original installed state is to reinstall the software.

Installing software on a large network of computers requires a large number of resources. First the IT Department must start the rollout. This can be expensive with employees working overtime hours or employing outside contractors. The users of the computers are interrupted from their jobs if the rollout is during normal business hours. Once the software is installed any future updates have to be planned and rolled out again. An automated tool to deliver and manage the software after installation could save IT Department immense time and money.

Software applications often need to be updated multiple times per year. Often times, IT Departments will neglect to install these updates for fear of breaking a system that may already be working. In many cases this behavior can lead to serious problems. Computers might be compromised because a security patch wasn't installed or a fatal crash bug at a production deadline can cause a company to lose hundreds of thousands of dollars in lost production time. All of these problems could be solved with an automated software distribution tool that employs scheduled software upgrades with the ability to schedule a rollback to a prior version.

Perhaps the most common method of installation is non-automated. Many enterprises still rely on manual installations by visiting each computer and running an installation program.

DESCRIPTION OF THE RELATED ART

There are applications that perform automated software distribution available in the market today. However, most of these application focus on the support for only one computing platform. If they do offer multiple platform support, the other supported platforms lack the features of the main platform supported. The software applications available rely on a server to make contact with the client, then the client and server have an interactive session.

In the Macintosh space there is Apple's Remote Desktop application. This is a peer-to-peer application that provides file and folder transfer on a rotating basis.

The transfers are done directly from the Administrative console. There is no scalability and reporting on the status of a transfer.

Also on the Macintosh is Netopia's NetOctopus. This application is also an Administrator based console, which provides many peer-to-peer functions including file and folder transfer and remote installations. This application does not scale beyond 150 clients for software distribution nor does it report on the status of a transfer nor does it monitor the installed software for future management.

In the Window's space there are many major products providing software distribution. Microsoft's SMS, Marimba, Novell's ZenWorks, Intel's LanDesk, OnTechnology's On Command, Altiris and Novadigm. The Microsoft, Marimba, Intel, On Technology and Altiris are Administrator console based solutions. But these software distributions show said disadvantages as well.

FIELD OF THE INVENTION

The invention relates to automated software distribution method on a TCP/IP network with one central server, multiple mirror servers and many clients. The clients automatically check in with a server, obtain a list of software, then perform the required actions at the specified times.

SUMMARY OF THE INVENTION

It is an object of the invention to device a method, software and a system that assist IT Departments to deliver and to manage software thereby saving the departments hundred of hours of their time and thousands of dollars of their budget.

The invention uses a data model that allows for individual files to be delivered and managed. The files are stored in a FileSet. In general a FileSet represents a software application. The clients share common FileSet Lists, while each client maintains a Cache or a list of FileSets that are currently in a state of management.

The invention uses a method whereby during a download of software, if a network connection is severed, the client will pickup with the download where if left off. In this way an application will not be activated before the sum of its parts is completely downloaded.

The invention can scale out to support thousands of clients. In such a case the invention makes use of Boosters. A Booster is an application that connects to another Booster or the FileWave Server itself and that downloads files from the central server to the local network. Clients then connect to the Booster in the local network and download their files from the Booster. The clients have a fail safe mechanism whereby they connect to another Booster if the Booster of this local network is not available.

The invention uses a method to capture the changes made to a disk during an installation. These changes are saved directly to the sever or indirectly to a hard disk for sharing with other servers.

The invention uses a central administrative interface to interact with the server, clients and administrative functions. All downloads are performed by the clients and from the server to the clients. Downloads are never directly from the administrative console to the clients.

It is another object of the present invention to devise a way to automate the installation of software and to maintain the state of the installation after the software is installed. Client software runs on each computer. The client software checks in with a central server if updates are available. If an update is available, the client first downloads a scheduled list of actions. Thereafter the client performs the scheduled actions at the appropriate time and reports back to the server the status of the actions in the client.

The invention enables an IT department to save a tremendous amount on man-hours installing and upgrading software. Another benefit is, that the end users of the computer or client are given greater use of their machines because the latest and most productive configuration of software is installed in the client and maintained here after the installation.

These and other objects of the invention are achieved by the method defined in the characterizing clause of claim 1.

BRIEF DESCRIPTION OF THE DRAWINGS

A more thorough understanding of the invention can be gained by reading of the following detailed description of the preferred embodiments in connection with the associated drawings, in which:

FIG. 2 shows schematically the client process;

FIG. 3 shows schematically the client verification process;

FIG. 4 shows schematically administrators snapshot process and

FIG. 5 shows schematically the administrators monitor client process.

DETAILED DESCRIPTION OF THE PREFERRED EMBODIMENTS

Figure 1:
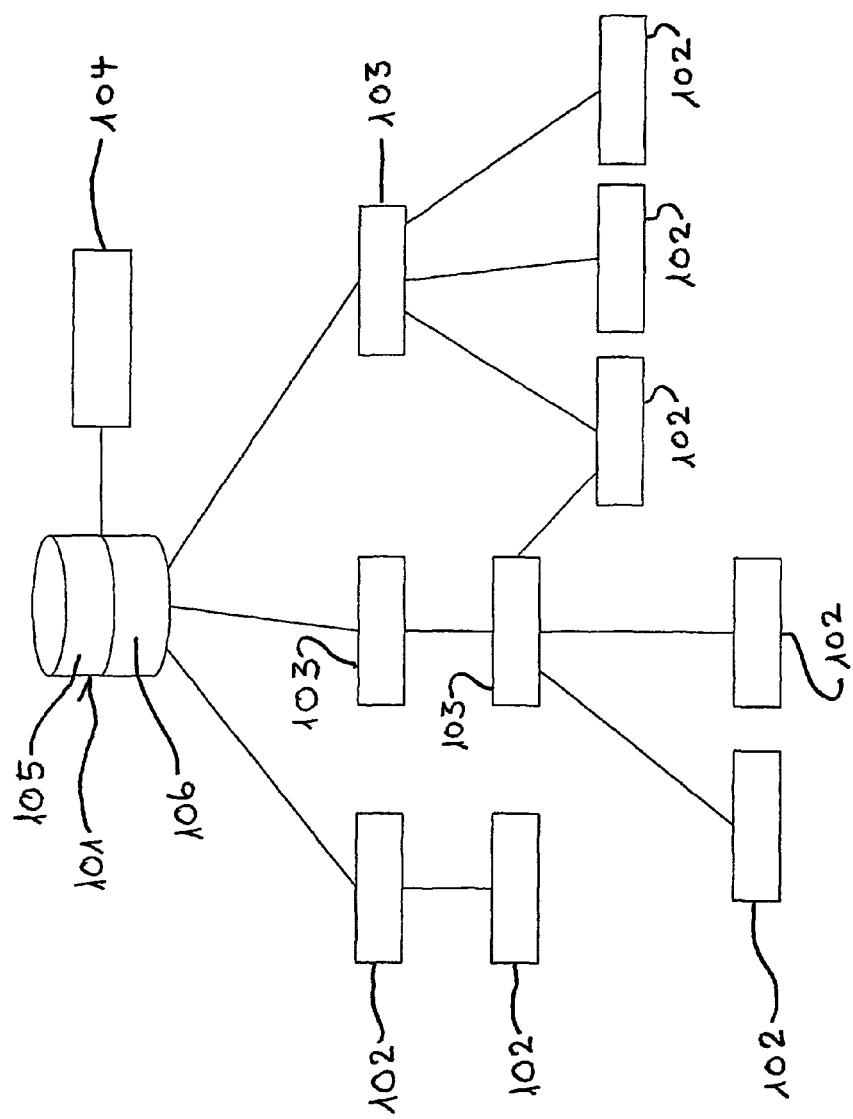
FIG. 1 is an overview of the infrastructure or system showing the scalability of the present invention.

In the following detailed description reference is made to the drawings to give specifics of how the invention works. The purpose of the description is to give those skilled in the art the ability to practice the invention. Other materials and processes may be used to sufficiently create an environment without departing from the scope of the present invention. The detailed description, which follows below, is therefore not to be taken in a limited sense. The invention will now be described with the drawings where like numbers represent like elements throughout the figures.

Systems, methods and devices consistent with the present invention enhance conventional methods of maintaining of the software on computers, i.e. clients connected to a TCP/IP network by automating software installations from at least one server or from a cluster of servers strategically placed throughout the network and by monitoring the downloaded software of each of the clients in the server or servers.

FIG. 1 is an overview of an arrangement, i.e. of hardware components, by aid of which the present method can be carried out. A basic configuration of this arrangement comprises a server 101, e.g. a FileWave Server, which can also be named central or main server. This server 101 comprises a relational database 105 of objects and a socket based file server 106. The basic configuration of said arrangement comprises also an administrator computer 104, e.g. a FileWave Administrator, which connects to the main server 101 through a socket and manipulates the database 105 in the main server 101. The administrator 104 is a console through which a person, who is managing the software to be downloaded, communicates with the server 101. Further, the basic configuration of said arrangement comprises client computers 102, which connect through a socket to the main server 101 and which can download their updates. All the links between 101, 102, 103 and 104 are advantageously through a TCP/IP interface.

A first embodiment of the basic configuration of the present arrangement might consist of one server 101 in a network of e.g. about one hundred clients 102 connected to the network, and of one administrator 104, which connects to the server 101. This server 101 will consist of the already mentioned database 105 and of already mentioned file server 106. The administrator 104 will be an interface to manipulate the entries in the database 105 of the main server 101. Each client 102 will convert the changes made in the database 105 of the server 101 into local disk operations e.g. copying, moving and renaming files.

FIG. 1 shows also a second embodiment of basic configuration of the present arrangement. This embodiment shows among other things also a scalability of the present invention. An enlarged configuration of said arrangement encompasses in this case at least one booster 103, e.g. a FileWave Booster. The booster 103 helps to download files to the clients 102. The booster 103 is a socket based file server, i.e. a file-storage device on a local area network that is accessible to all clients. The booster or the boosters 103 allow according to the present invention to scale out for supporting thousands of clients 102 by mirroring the files contained on the main server 101.

The boosters 103 are strategically placed in networks where connectivity issues require such a local server 103 to be present. For example, in an international organization having access for multiple clients 102, the download of the same data from the central server 101 directly to each of said clients 102 is not efficient. A mirror or booster 103 of the central server 101 in each location of the network is an efficient way to share the common data among the clients 102 in each location.

Generally, boosters 103 are deployed at remote offices to decrease network traffic on WAN lines (Wide Areas Network lines). Boosters 103 may also be deployed in a LAN (Local Area Network) when there are a significant number of clients 102 on the LAN. The booster 103 will always ensure that the client 102 receives the needed files by downloading and it will make sure that network traffic with the main server 101 is kept to a minimum.

For a particular case, a client 102 needs a number of like files. This number of like files is named a fileset. A fileset might be a program like Microsoft Office or an operating system like Mac OS 10.2. Usually, a client 102 is associated to a number of filesets. A list of such filesets for each client computer 102 can also be named a manifest. So that the manifest comprises among other things a list of the filesets that the respective client 102 is to perform actions on. The manifest contains also identification numbers of the filesets, version of the filesets and attributes associated with a fileset, such as activate, deactivate, passive and delete.

The database 105 of the server 101 creates and maintains an individual list of filesets or a manifest for each client computer 102. The manifest is maintained in the database 105 of the server 101. After each published change or update to the model version made by the administrator 104, a new manifest is created for each client 102.

To deliver a new application to the clients 102, the administrator 104 will add new file records representing the new application into the database 105, i.e. into the repository, and associates these file records to the clients 102. After the administrator 104 has completed its work by updating the main server 101 and publishing the changes, the server 101 calculates for each client the filesets associated with the client and creates the client's manifest file. Next the server 101 calculates the contents of each fileset and saves the relevant information about each file (version number, identifier number, name, creation date, modification date, comment, etc.) into the fileset container in the database or repository 105. If there are no changes to the fileset then the version number of the fileset remains the same. If changes were made to the fileset, then the version number of the fileset is increased by an ordinal number. There is exactly one fileset container for every fileset version on the server 101.

FIG. 2 shows schematically the process or operations in one client computer 102. The client process performs all the client side operations. It is responsible for downloading, activating, deactivating and deleting files.

Each of the clients 102 is periodically polling 201 the server 101 looking to see in the repository 105 of the server 101 if a change in the model version of the manifest associated with this client 102 is available. Thereby the client 102 at the first only checks 201 for a new model version of its manifest in the server 101 or booster 103. This check 202 is based on the comparison of the ordinal numeral which is associated with the model version of the manifest on the server 101 or booster 103 with the ordinal numeral of the client version of the manifest. If these ordinal numerals are the same, no change in the software on this client computer 102 is to be carried out. If said ordinal numerals are different, then the client 102 knows that the server 101 comprises a changed manifest. This new model version of the manifest is to be downloaded 203 to the client 102.

The downloaded fileset list or manifest is compared 204 to the last fileset list or manifest the client 102 has. The appropriate local operations are scheduled based on a delta 204 of the two lists. The scheduled fileset operations are then stored 205 in cache. The local operations are performed 206. Finally, the client 102 reports back 207 to the server 101 or 103 the new version of the local model version of the manifest. In this manner the processing load of the server is distributed to each client making a type of Distributed Computing.

A second scenario might be a network of e.g. one thousand of clients 102 where the administrator 164 needs to deliver a new application to only fifty of these clients 102. In this scenario the administrator 104 will add file records representing a new or another application in the database 105 to the said fifty clients 102 that are to receive this new application. When the administrator 104 has completed the changes in the repository 105, the administrator 104 updates the server 101 and therefore steps by one the ordinal numeral the manifests associated with all clients 102 maintained on the central server 101. The thousand clients 102 will poll 201 the server 101. The nine hundred and fifty clients 102 without 202 will compare the versions of each fileset container in their manifest and the client 102 will determine no changes have been made to their manifest and consequently they will not perform local operations, e.g. local disk operations. Said fifty clients 102, which have to receive the new application, will download 202 their manifest, compare 203 the fileset versions, determine 204 a new fileset was added to their manifest and then schedule 205 their file operations, i.e. their downloads, perform the file operations 206 at the scheduled time and activate the new application. This scenario shows the flexibility of the invention in that only the clients 102 assigned to the new file records perform local operations.

Another scenario might be a worldwide network of one thousand computers 102 that needs e.g. a mission critical application activated at an exact time. Some of these clients 102, as shown in FIG. 1, are connected to the main server 101 through one or more boosters 103. The administrator 104 adds the file records creating said fileset on the server 101 and associates the fileset to all one thousand clients 102. Finally the administrator updates the server 101 which causes new manifests with new model version to be created. The clients poll 201 the server, see the new manifest files and process their manifest. At the scheduled time from the manifest, the clients 102 connected to one of the boosters 103 will request to download the files from the local booster 103 rather than from the master server 101. Finally at the exact time, the just downloaded applications will be activated. In this way the distribution is scaled and the clients 102 download the file records from the local booster 103 rather than accessing the master server 101 over the entire network. Therefrom results an increasing speed, reliability and bandwidth when downloading applications.

The above scenarios are exemplary and should not be construed in a limiting sense. One skilled in the art will appreciate the present invention will have a variety of implementations not limited to the ones previously described.

When communicating, the clients 102 and the servers 101 and 103 make use of a special protocol. This protocol allows for the clients 102 to resume downloading of a file in case the connection to a server 101 or to a booster 103 is broken. The client 102 initiates the communication with a server 101 or 103. If at any time the client 102 or the repository 105 does not respond to a transaction demand, then the client 102 will go into a disconnected state. If this communication is severed said protocol makes it possible to reestablish the communication later with no adverse effect to the clients 102 or servers 101 or to a booster 103. When a connection is established again, the client 102 will start with the last transaction till all the transactions are complete.

When initiating the communication with a server 101 or with a booster 103, the client 102 builds a packet with a transaction identifier or file. This transaction identifier represents the type of information to be transferred between the client 102 and the server 101 or the booster 103. The most commonly used transaction files are: Logon, to open a connection to the server 101, Status, to check the model version in the server 101 related to the respective client 102, Read, to copy or download data from the server 101 to the client and Update, to send the status of the local model version present in the client 102 to the server 101.

Network operations are performed automatically by the client 102 starting with an attempt to logon to the repository 105 of the server 101 or booster 103. If a logon cannot be established, the client 102 automatically retires and waits until a connection to the server 101 or booster 103 can be established. Once a connection to the server 101 or booster 103 is established, the client 102 checks his model version in the repository 105 by sending his status transaction packet to the server 101 or booster 103. When the model version in the repository 105 of the server 101 or booster 103 is different from the local model version sent from the certain client 102, this client 102 requests at the server 101 or booster 103 a read transaction to download a manifest from the repository 105.

The client 102 has further a scheduling feature where files that are members of the same fileset (like files that make up an application) are all scheduled for actions at the same time. This assures the complete application is scheduled.

Some of the client side scheduled actions can be executed by the client 102 independently of a network connection to the server 101 or booster 103. This execution is applicable only for the client side actions to activate, deactivate and to delete. Copy actions by nature require a connection to a server 101 or booster 103.

FIG. 3 shows schematically the verification process in one client computer 102. The client process performs a verification process at certain time intervals 301 to ensure that all data on the client remains unchanged. When the time has come for the verification process, the client process will look at all assigned fileset lists 302, and for every of these fileset lists verifies that the actual data in the live file system is the same 303. If the verification process results in differences, the client process will 304 fix all changes, and ensures that the data in the client system is exactly as it is contained in the fileset list.

A further application, e.g. the FileWave™ FileSet Magic, belongs to this invention and it creates a snapshot and a comparison (FIG. 4) to find changes made on a hard disk. In this way the files installed or modified by an installer can be found. The changes to the hard disk are saved in a fileset. The fileset is saved directly to the server 101 or saved locally for import to the server 101 at a later time. This allows for sharing of filesets among the community of administrators 104. FIG. 4 shows schematically the snapshot process. In the first step 401, the administration application scans a hard disk in the client computer 102, or certain areas of it, for the current existing data. Then the installer 402 is executed. After that, the administration application again scans 403 the hard disk, or certain areas of it, and then compares 404 the two scans. The comparison results are presented to the user for verification and modification, and then stored into the fileset 405, either locally on the administration computer, or directly onto the server 101. The present method encompasses also an application which creates and modifies a preference file. This preference file is then distributed to the clients where it will only override the preferences specified in the SuperPrefs file, the individual preferences of the client will remain in tact. The present method encompasses further an application which creates rule files. These rules specify files and folder that are to be removed or retained on a client computer. A further application belonging to the present method allows for real time remote access to a client 102. Supported features are status information, preference access, system information reporting and diagnostics for the client process 102.

FIG. 5 shows schematically a client monitor process. The admin process establishes a connection 501 to the client. The client then responds by sending either the status data 502, or the preferences data 503, or allows remote control 504.

The present method encompasses also an application which creates and modifies a preference file. This preference file is then distributed to the clients where it will only override the preferences specified in the SuperPrefs file, the individual preferences of the client will remain intact.

The present method encompasses further an application which creates rule files. These rules specify files and folder that are to be removed or retained on a client computer.

A further application belonging to the present method allows for real time remote access to a client 102. Supported features are disk drive browsing, status information, preference access, system information reporting and diagnostics for the client process 102.

The invention claimed is:

1. A method in a network whereby client computers automatically communicate with a server computer or computers such that the client computers automatically perform actions to install, update, deactivate or uninstall software bundles at specific times without any human interaction based on a model created, maintained and modified by a system administrator, wherein intelligent client software autonomously works to reach or maintain a state of software bundles specified by the model, comprising:

means for self healing by maintaining the model state at a specified interval by checking and verify the presence and integrity of every single file and folder specified in the said model;

means of detecting model changes on the server by periodically contacting the said server whereby said intelligent client software automatically updates the said model state to the said model state specified by said server; means of fault tolerant downloading of all data files from said servers whereby the interruptions in data transfers are handled transparently by the said client software such that the said client software will resume data transfer when the network integrity is restored;

means of autonomously downloading and interpreting data files from the said server computers consisting of the user manifest describing the software bundles applicable to the said client, the fileset container describing the contents of the said software bundles and the actual files that form the said software bundle; means of autonomously activating files in the said software bundle such that the said software bundle is said autonomously downloaded; means of detecting different types of files such as executables, shell scripts or custom installers such that execution of said files is performed by the said client software if endorsed by the said model;

means of autonomously detecting changes in said user manifest after said model changes are committed whereby said client computer software calculates differences of said user manifest compared to said model state of software bundles maintained by said client computer software wherein a said software bundle added difference creates a said download and a said activation wherein a said software bundle remove difference creates a said deletion of the software bundle wherein a said software bundle modified difference creates an updated time schedule for download action, deactivation action or deletion action whereby client computer software distributes processing power from said server computer whereby said server computer is only responsible for replying to download software requests;

means of detecting changes in fileset containers after detection of said model changes whereby said client computer autonomously calculates differences in said fileset containers whereby said client computer software creates said download, said activation or said deletion actions to perform based on said differences in said fileset container wherein said download and said activation actions are performed when said difference reveals a new file difference and wherein a said delete action is performed when said difference reveals a deleted file difference from said fileset container wherein a modification action is performed when said difference reveals a change difference whereby client computer software performs said processing power distribution;

means of reporting all said actions of downloading, activating, deactivating, deleting or updating said software bundle to said server whereby a system administrator creates a status report revealing the success of said state of software bundle action;

means of remotely monitoring the progress of said state of said client software by said system administrator.

2. A method as claimed in claim 1 wherein the server computer creates and maintains fileset containers wherein the server calculates a new fileset container at each committed change of the server model wherein the fileset contains the record identifier, name, size, checksum, permissions and attributes of each file in a software bundle.

3. A method as claimed in claim 1 wherein the server computer creates and maintains user manifests wherein the server calculates a user manifest for every client computer containing a list of all software bundles associated to each client computer as well as the times when the said software bundles should be downloaded, activated, deactivated or deleted by the client computer software.

4. A method as claimed in claim 3 wherein the server computers maintain a model version wherein the model version increases by one after each committed change of the model by the system administrator.

5. A method as claimed in claim 1 wherein graphical user interface administrator software displays and modifies the said model, comprising:

means for displaying, creating and modifying user accounts; means for displaying, creating and modifying user groups of said user accounts; means for adding or removing said user accounts to or from multiple said user groups; means for displaying, creating and modifying said software bundles wherein modifying a software bundle allows said system administrator to add, delete, move, rename said files wherein said system administrator can modify permissions, operating system flags and said self healing behavior of said files; means for associating said software bundles to said user accounts or said user groups; means of remotely monitoring said server software; means of remotely monitoring said client software: means of remotely modifying said client software settings; means of remotely installing or updating said client software; means of modifying said client software settings on multiple said client computers in a single operation from said system administrator.

6. A method as claimed in claim 5 wherein a said graphical user interface administrator software creates new said software bundles wherein said administrator software creates a pre installation snapshot of said administrator's hard disk and compares the said pre installation snapshot whereby the said system administrator decides on a file by file basis whether said file should be added to the said software bundle.

7. A method as claimed in claim 1 whereby said software downloads are distributed across a network with a booster server computer such that said files are autonomously downloaded from said server computer to said booster computer upon request by said client computer software whereby said client computer software requests said file from multiple said booster computers thereby providing fail safe load sharing the said file download operations.

8. A method as claimed in claim 1 whereby said software components are designed to run on any operating system that supports TCP/IP network protocols whereby each said client, said server, said booster and said administrator software communicates with said components running on any said operating system.

* * * * *